G. F. EVANS.

Animal Shearing Machine.

No. 6,622.

Reissued Aug. 31, 1875.

Witnesses.

J. Martin Jr.

J. N. Fairbee.

Inventor.

George F. Evans by

Mason, Fenwick & Lawrence

Attys

N. PETERS, PHOTO-LITHOGRAPHER, WASHINGTON, D. C.

UNITED STATES PATENT OFFICE.

GEORGE F. EVANS, OF POLAND, MAINE.

IMPROVEMENT IN ANIMAL-SHEARING MACHINES.

Specification forming part of Letters Patent No. 119,019, dated September 19, 1871; reissue No. 6,622, dated August 31, 1875; application filed April 29, 1875.

*To all whom it may concern:*

Be it known that I, GEORGE F. EVANS, of Poland, county of Androscoggin, formerly of Norway, county of Oxford, State of Maine, have invented a new and useful Animal-Shearing Machine; and I do hereby declare that the following is a full, clear, and exact description thereof, reference being had to the accompanying drawings making part of this specification, in which—

Figure 1:
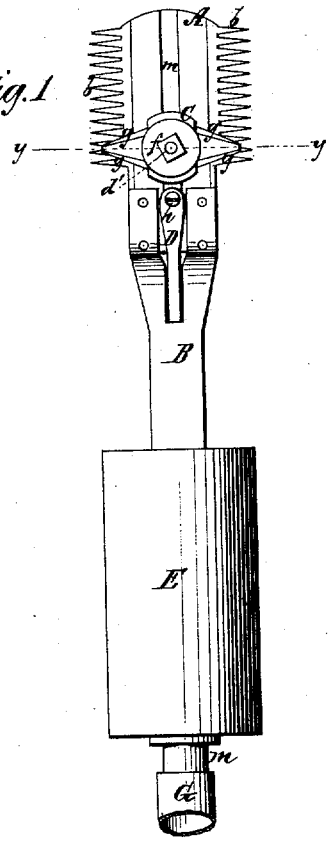
Figure 2:
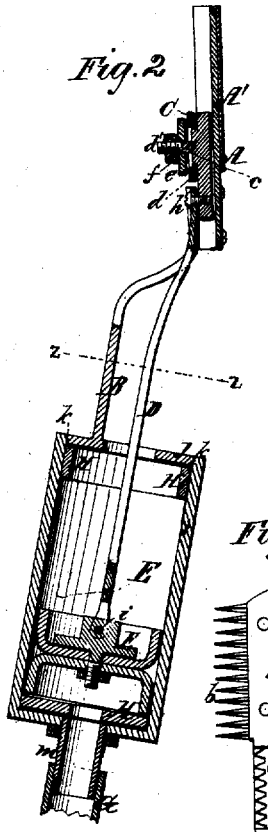
Figure 3:
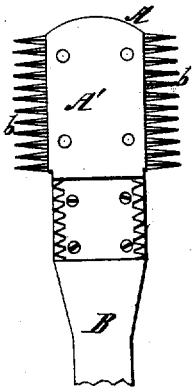
Figure 4:
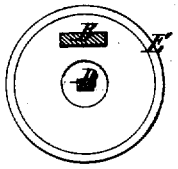
Figure 6:
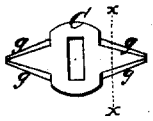
Figure 8:
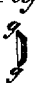
Figure 7:
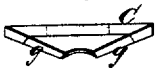
Figure 5:
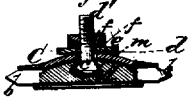

Figure 1 is a top view of my improved shearing and clipping machine, the pipe for conducting the air from and back to the air-pump or air-supplying bulb being broken off. The air-pump or air-pressing bulb is not represented. Fig. 2 is a vertical central section of the same. Fig. 3 is a bottom view of the comb and a portion of its handle. Fig. 4 is a cross-section in the line *z z* of Fig. 2, looking toward the cylinder and piston. Fig. 5 is a cross-section in the line *y y* of Fig. 1. Fig. 6 is a top view of the cutter; Fig. 7, an end view of the same; Fig. 8, a cross-section of the cutter in the line *x x* of Fig. 6.

The nature of my invention consists, first, in the combination, with a shearing or clipping cutter, a comb-plate, and a handle, of an air-engine worked by a vibrating column of air contained in a tube leading to and from the piston, and applied between the said engine and the power-pump, or power-generator. By this construction the cutter is reciprocated, and the speed of the cutter is regulated by the back and forward motions of the column of air which remains in the tube and air-engine which transmits the power to the cutter of the shearing-machine.

My invention consists, second, in a certain construction and arrangement or combination of parts, as hereinafter described and specifically claimed.

A is a comb-plate, having a convex top; B, the arm or handle thereof; C, a reciprocating cutter; D, a pitman of the cutter; E, a cylinder connected to the handle B of the comb-plate; F, a piston formed of two cup-leathers, a clamping-piece and nut, or in any other well-known appropriate manner; G, a pipe through which air is supplied to and exhausted from the cylinder. H H are cushions at the ends of the cylinder for the piston to pack against.

The comb-plate has teeth *b b*, which are of V form in transverse section, and of tapering form lengthwise. Each tooth has two cutting-edges, one on each side. The teeth are horizontal on top, and run outward to a point, leaving V spaces between them. The roots or thicker ends of the teeth are confined in grooves of the plate A by a plate, A′, or in any suitable manner. Each side edge of the plate A is furnished with teeth. In the center of the top or convex side of the comb-plate a straight groove, *m*, having an under bevel or dovetail form, is cut into the plate from end to end. In this groove a dovetail cutter-head, *c*, is fitted. This cutter-head has a rectangular shoulder, *d*, formed on it, and from this shoulder a screw-pin, *d′*, extends up vertically. The cutter C is fitted to the comb-plate by passing it down over the pin *d′* and shoulder *d*, and confining it by washer *e* and nuts *f f*. The cutter C is made of metal struck up in form of a saddle, so as to fit closely the curved side of the comb-plate and the horizontal surface of the teeth, and it has bevel cutting-edges *g g*, which stand on opposite sides of the cutter-head, as shown in Figs. 1, 5, 6, 7, and 8. The front edges cut in one direction and the back edges cut in opposite directions.

The cutter has a square opening in its back to admit the square shoulder of the head through it, and by this means the cutter is kept from slipping around when in operation. The arching form of the cutter gives it elasticity, and by means of the washer and nuts it can be made to fit with a spring contact very closely to the teeth *b b*, and thus work with great perfection. The cutter is self-sharpening, as the back movement puts an edge on the forward cutters, and the forward movement an edge on the rear cutters. The pitman D is connected to the stem of the cutter-head by a vertical pivot-pin, *h*, and to the center of the piston F by a transverse pivot-pin, *i*. The cylinder is connected to the arm or handle of the comb-plate by means of a screw-head, *j*, of the cylinder, as shown at *k*. By unscrewing this head the piston can be removed. The cylinder forms an extension to the handle, and is carried in the hand by the operator while shearing or clipping is being performed. Both of the heads of the cylinder are perforated—the forward head for the purpose of permitting the pitman-rod to play freely while the piston is being reciprocated, and the rear head for the purpose of admitting the air for driving the piston forward, and allowing said air to again pass back when the piston is making its back stroke. On the end of the cylinder where the air is admitted a short hollow pipe, *m*, is fastened, and on this pipe the end of the rubber tube G is fastened. The tube G is to connect with an air forcing and exhausting pump, or an air forcing or exhausting bulb of any ordinary construction.

In operating with my machine, the comb-plate with cutter upon it is adjusted upon an animal's back, and air is pumped into the cylinder by an air-pump or air-bulb, such as mentioned above. The pressure of the air forces the piston, pitman, and cutter forward in a straight line, and by this means the cutter clips the hair or wool, which extends up between the teeth *b b* on both sides of the cutter-head. The action of the operator upon the air-pump or air-bulb for a new stroke forward causes the air which is in the cylinder to flow back into the air pump and tube, and the vacuum thus formed, and the atmospheric pressure forward of the piston, cause the piston to move back for another forward stroke. On the back movement the cutter cuts the wool or hair which may be extending between the teeth of the comb-plate. The back movement of the cutter is a very slow and regular one, on account of the air in the tube G acting as a cushion, and by operating with an engine, which receives and exhausts through the same pipe, the apparatus can be governed and regulated very perfectly.

By my invention the operation of shearing can be performed by either one or two persons. If by one person, the air-bulb or air-pump will be operated with one hand, and the shearing implement controlled by the other; and if two persons are employed, one will work the air-pump, and the other carry the implement and control its operation.

The direct or straight movement of the cutter enables me to work on both sides of the cutter-head at the same time, and to cut both in the back and forward movement. This arrangement of the cutter also greatly simplifies the machine in construction. The construction of the cutter and its arrangement upon its head, as described, is also of considerable value.

What I claim is—

1. In combination with a shearing or clipping cutter, comb-plate, and handle, an air-engine, operated by a vibrating column of air contained in a tube which is between the said engine and the pump or power generator, substantially as and for the purpose described.

2. The removable screw-head *j*, with the rod B rigidly attached, in combination with the pitman connected to the cutter-head, substantially as and for the purpose described.

3. The straight moving reciprocating cutter, the comb-plate and its handle, the cylinder, the piston and its pitman, and the pipe G, combined substantially as and for the purpose described.

4. The cutter-head and cutter, in combination with the longitudinally-grooved comb-plate, substantially as and for the purpose described.

5. The cutter having an arching form in cross-section from its point to its heel, as shown, and made with two beveled horizontal cutting-edges on either side of the comb-plate, substantially as described.

6. The cutter having an arching form between its points, as shown in Fig. 5, and an arching form between its cutting-edges, as shown in Fig. 8, and beveled horizontal cutting-edges on its front and rear, and on both sides of the cutter-head, substantially as and for the purpose described.

GEORGE FRANKLIN EVANS.

Witnesses:
E. N. McCann,
F. Andrews.